United States Patent [19]

Wada

[11] 4,175,002
[45] Nov. 20, 1979

[54] NUCLEAR FUEL PELLET WITH OPPOSITELY BOTTOMED HOLES

[75] Inventor: Toyoji Wada, Kawasaki, Japan

[73] Assignee: Tokyo Shibaura Electric Co., Ltd., Kawasaki, Japan

[21] Appl. No.: 830,143

[22] Filed: Sep. 2, 1977

[30] Foreign Application Priority Data

Sep. 6, 1976 [JP] Japan .................. 51-106368

[51] Int. Cl.² .................................. G21C 3/04
[52] U.S. Cl. .................................. 176/66; 176/73; 176/76
[58] Field of Search .................. 176/66–68, 176/73, 74, 76, 78

[56] References Cited

U.S. PATENT DOCUMENTS

| 3,365,371 | 1/1968 | Lass et al. | 176/74 X |
| 3,415,911 | 12/1968 | Lloyd | 176/73 X |
| 3,804,710 | 4/1974 | Bresnick | 176/68 X |

FOREIGN PATENT DOCUMENTS

| 1003127 | 4/1977 | Canada | 176/74 |
| 4932911 | 6/1970 | Japan . | |
| 50-160692 | 12/1975 | Japan . | |
| 971930 | 10/1964 | United Kingdom | 176/74 |

OTHER PUBLICATIONS

Steinar AAS, Mechanical Interaction Between Fuel & Cladding, Nuc. Eng. & Design, 21, 1972, pp. 237–253.

*Primary Examiner*—Peter A. Nelson
*Attorney, Agent, or Firm*—Oblon, Fisher, Spivak, McClelland & Maier

[57] ABSTRACT

A nuclear fuel pellet is made of a sintered, ceramic nuclear fuel mass and has a cylindrical configuration with a pair of opposite bottomed holes centrally provided one at each end. The bottomed holes are convergent toward their bottoms and each have a U-shaped cross-section. A ratio of the diameter of the opening to the depth of the bottom hole is smaller than unity. The nuclear fuel element is free from defects such as cracks, easy to manufacture and capable of reducing a PCMI (a pellet-clad casing mechanical interaction).

4 Claims, 8 Drawing Figures

NUCLEAR FUEL PELLET WITH OPPOSITELY BOTTOMED HOLES

BACKGROUND OF THE INVENTION

This invention relates to a nuclear fuel pellet, and in particular nuclear fuel pellet (hereinafter referred to merely as pellets) received into a clad casing equipped with sealing and plugs.

Generally, a nuclear fuel rod for use in an atomic reactor of an atomic power plant has a construction shown in FIG. 1. In FIG. 1, a plurality of pellets 2 are received into a clad casing 1 and the casing is sealed by end plugs 3 and 4. The pellet 2 is formed by compression molding powdered ceramic nuclear fuel such as uranium dioxide and a mixture of uranium dioxide and plutonium dioxide into a cylindrical mass and sintering it at high temperature. A spring 5 is disposed in a plenum chamber 6 between the pellets and one end plug to prevent displacement of pellets 2. A helium gas is filled in the plenum chamber 6 as well as between the pellets 2 and the casing 1.

When an atomic reactor using such pellets 2 is operated, the pellet 2 generates a heat by a nuclear fission and becomes a high temperature. Since at this time a ceramic pellet has a small thermal conductivity, the central portion of the pellet becomes a very high temperature in comparison with the peripheral portion of the pellet. In this way, a temperature distribution is produced in the pellet 2. Such a thermal expansion difference causes, as shown in FIG. 2, the end surfaces 2a and 2b of the pellet to be deformed in a convex way and the side surfaces 3c of the pellet to be deformed in a concave way. As a result, the pellet is deformed in the form of an hour glass. The radial deformation of the pellet is greater at the end edge portions than at the central portion due to an "end surface effect".

In this way, the pellet 2 becomes a high temperature and is greatly expanded into contact with the casing 1 with the result that a mechanical interaction (i.e. PCMI) occurs between the pellet 2 and the casing. The nuclear fuel rod is designed such that, in order for the casing not to be greatly deformed under the condition of PCMI, an axial expansion of the pellet 2 is absorbed by the plenum chamber 6 and a radial expansion is absorbed by the clearance 7. The pellet under the usual intra-reactor conditions is not always centrally located in the clad casing and the narrow clearance 7 is often left to one side. In consequence, it is considered that a weak PCMI is always present there. In order to reduce PCMI to a maximum possible extent, pellets of varying shapes have been proposed as will be explained below.

The pellet 10 shown in FIG. 3 has plate-like dimples 11 and 12 which are formed one at each of the end surfaces 8 and 9. The pellet 13 shown in FIG. 4 have its end edge portions chamfered to provide bevel portions 14 and 15, respectively. The pellet 16 shown in FIG. 5 has a central through bore 17. These pellets 10, 13 and 16 are all designed to absorb some deformation and alleviate PCMI, but not sufficient since they have advantages and disadvantages. Stated briefly, the pellet 10 shown in FIG. 3 absorbs an axial expansion, but a radial expansion is increased. A force from an overlying pellet is concentratedly applied to the marginal edge portion of the end 8 of the pellet 10 to cause further deformation to occur. The pellet 13 shown in FIG. 4 absorbs a radial expansion at the end portions, but no axial deformation is absorbed. Furthermore, no uniform compression is effected during the manufacture of the pellet, developing cracks called "capping". The pellet 16 shown in FIG. 5 is not fitted for mass production, since a complicated process is required in compression molding the poweder mass. Moreover, during the burning of the pellet within the atomic reactor fragments produced by the breakage of the pellet 16 and dropped through the through hole 17 and accumulated on the bottom of the casing 1, thereby making a temperature distribution nonuniform.

SUMMARY OF THE INVENTION

It is accordingly an object of this invention to provide a nuclear fuel pellet which is free from defects such as cracks, easy to manufacture and capable of alleviating PCMI.

According to this invention there is provided a nuclear fuel pellet made of a sintered ceramic nuclear fuel mass and having a cylindrical configuration with a pair of opposite bottomed holes centrally provided one at each end, the bottomed holes being convergent toward their bottoms and having a U-shaped cross-section, in which a ratio of the diameter of the opening to the depth of the hole is smaller than unity.

BRIEF DESCRIPTION OF THE DRAWING

This invention will be further described by way of example by referring to the accompanying drawings, in which.

DETAILED DESCRIPTION OF THE PREFERRED EMBODIMENTS

The embodiments of this invention will be explained by referring to the accompanying drawings.

Figure 1:
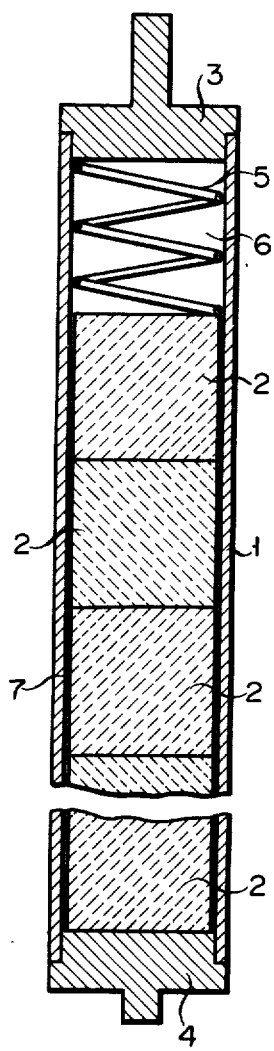
FIG. 1 is a longitudinal cross-sectional view showing a conventional nuclear fuel rod.
Figure 2:
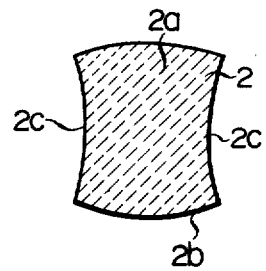
FIG. 2 is a longitudinal cross-sectional view showing a state when the pellet of a nuclear fuel is burned.
Figure 6:
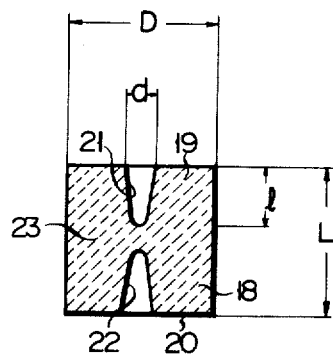
FIGS. 6 to 8 are longitudinal cross-sectional views showing pellets according to this invention.

In FIG. 6 a pellet 18 is obtained by compression-molding powdered ceramic nuclear fuel, such as powdered uranium dioxide, at a molding density-theoretical density ratio of 51% and sintering it for 2 hours at 1,700° C. in a stream of hydrogen. A pair of bottomed holes 21, 22 are centrally provided one at each end of the pellet 18. The opposite bottomed holes 21 and 22 are convergent toward their bottoms to provide U-shaped cross-sections. A ratio d/l of the diameter d of the opening to the depth l of the holes 21 and 22 is smaller than unity. The holes 21 and 22 of the pellet 18 do not communicate with each other. Pellets 18 having, for example, a diameter D of 12.4 mm, a length L of 12.5 mm, a hole diameter d of 2 mm, a hole length l of 3 mm and a hole inclination of 1/5 were received, as shown in FIG. 1, into a clad casing 1, and both the ends of the clad casing 1 were sealed to assemble a nuclear fuel rod. Irradiation tests were conducted under such a condition that PCMI tends to occur. It has been found that the extent to which the clad casing 1 is locally deformed under the PCMI condition is very small and that the axial elongation is smaller than that of a conventional counterpart.

Figure 5:
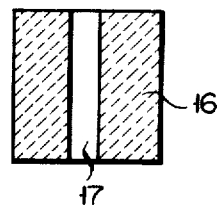

Likewise, pellets whose d/l ratios were greater than unity was manufactured and a nuclear rod was assembled using these pellets. However, no comparable effect was founded in comparison with those pellets whose d/l ratio were smaller than unity. Unlike a pellet 16 shown in FIG. 5, the pellet as shown in FIG. 6 has its opposite holes 21 and 22 bottomed, preventing a drop of fragments as occurs due to the destruction of the pellet during irradiation. As a result, the temperature distribution was made uniform.

Pellets having no such holes 21 and 22 were manufactured under the same condition. In this case, a very narrow crack appeared on the end surfaces of the pellet and a local deformation of the clad casing 1 was developed under such a condition that PCMI tends to occur.

Figure 3:
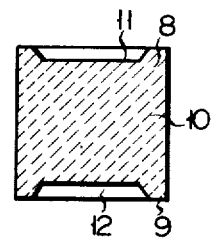
FIGS. 3 to 5 are longitudinal cross-sectional views showing conventional pellets.
Figure 4:
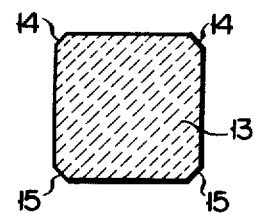
Figure 7:
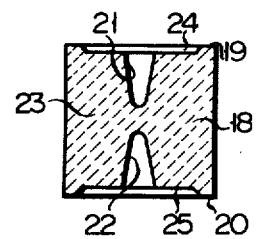
Figure 8:
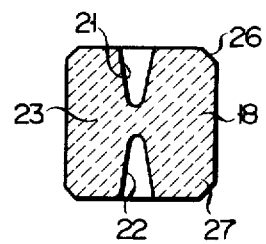

Although the nuclear fuel element as shown in FIG. 6 has been explained, this invention is not restricted thereto. The nuclear fuel element may have shapes as shown in FIGS. 7 and 8. A pellet shown in FIG. 7 has, like a pellet shown in FIG. 3, shallow plate-like dimples 24 and 25 which are provided one at each end. A pellet shown in FIG. 8 has, like a pellet 13 shown in FIG. 4, its peripheral end edges chamfered to provide bevel surfaces 26 and 27, respectively. It has been found that the pellets shown in FIGS. 7 and 8 involves a decreased PCMI in comparison with the pellet shown in FIG. 6. A better result can be obtained if the shoulder of the bottomed holes 21 and 22 of the pellet shown in FIG. 7 is curvilinearly formed.

What is claimed is:

1. A nuclear fuel pellet made of a sintered ceramic nuclear fuel mass and having a cylindrical configuration with a pair of opposite bottomed holes centrally provided one at each end, said bottomed holes being convergent toward their bottoms and each having a U-shaped cross-section, in which a ratio of the diameter of the opening to the depth of the bottomed holes is smaller than unity.

2. The nuclear fuel pellet according to claim 1, in which said sintered mass has shallow plate-like dimples provided one at each end, said convergent bottomed holes being provided at the central portions of the recesses.

3. The nuclear fuel pellet according to claim 2, in which each of said convergent bottomed holes includes and edge portion located at the intersection of said convergent bottomed hole and said shallow plate-like dimple and wherein said edge portion is curvilinearly formed.

4. The nuclear fuel pellet according to claim 1, in which the peripheral end edges of the sintered mass are chamfered.

* * * * *